United States Patent Office 3,014,797
Patented Dec. 26, 1961

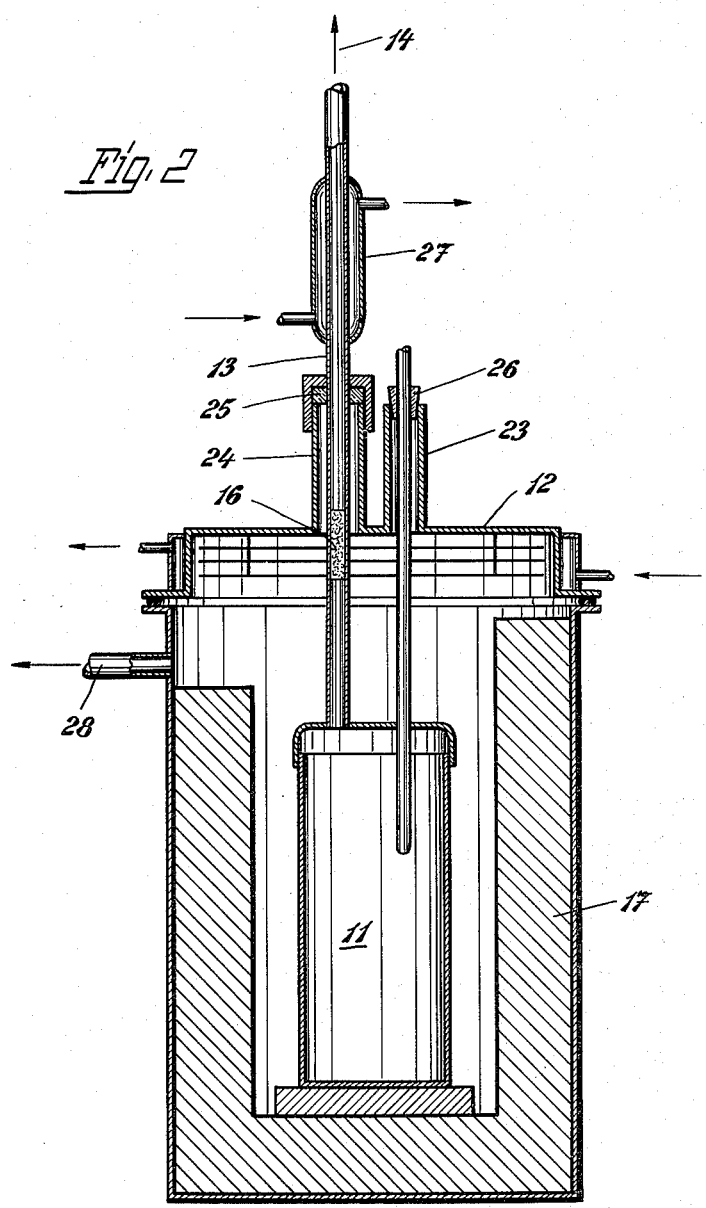

3,014,797
PREPARATION OF PURE METALS OF THE RARE EARTH METALS, TITANIUM, ZIRCONIUM, AND HAFNIUM
Stefan Elischer, Trostberg, Bavaria, Germany, assignor to Suddeutsche Kalkstickstoff-Werke Aktiengesellschaft, Trostberg, Bavaria, Germany
Filed Oct. 31, 1958, Ser. No. 771,011
6 Claims. (Cl. 75—62)

The invention relates to the preparation of metals like titanium and zirconium of a high degree of purity.

Said metals and other metals of the IIIB to VIB groups of the periodic chart of the elements (see Handbook of Chemistry and Physics, 39th ed., p. 400), such as lanthanum, cerium, hafnium thorium, uranium, can be obtained from their oxides only by reduction with alkali metals or alkaline earth metals, whereby the term "alkaline earth metals," as used in the specification and claims, is intended to include magnesium. The metals thus obtained are very reactive and react already during the reduction process with the air oxygen and nitrogen. On the other hand, even very small amounts of impurities affect the physical properties of the metals. In order to avoid contamination, the reduction has, therefore, been carried out in the atmosphere of a protective gas (noble gases, hydrogen). This, in turn, requires a complete purification of such gases, and even then it is not always successful because a homogenization of the reactants metal oxide (solid) and reducing metal (liquid) is not possible at the high reaction temperature.

Reduction methods of the type here involved are disclosed, for instance, in Patents Nos. 2,537,067; 2,537,068, and 2,707,679 by William C. Liliendahl et al.

It is a principal object of the invention to provide a process for the reduction of the recited metal oxides with production of metals of highest purity, which process does not require either a protecting atmosphere or homogenization.

Other objects and advantages will be apparent from a consideration of the specification and claims.

According to the invention, the reduction is carried out in a high vacuum whereby the evacuated reaction zone is sealed against the atmosphere by a plug of precipitated reduction metal itself. The thus obtained hermetically sealed reaction zone allows of subjecting the metal oxide to the action of the vapor of the reducing metal for such an extended time as to ensure that the reduction metal may penetrate into all fissures of the crystallites of the reduced metal, and vice versa, that the oxygen dissolved in said crystallites may diffuse to the surface and there react with the reducing metal. The hermetically sealing plug of the reduction metal is obtained by providing an otherwise completely closed reaction vessel with a capillary tube connected to a vacuum pump. The reduction mixture is introduced in the reaction vessel, which is then placed under vacuum and heated; after the desired high vacuum is obtained, the capillary tube is cooled so that evaporated reduction metal is precipitated therein and seals off the reaction vessel.

Apparatus suitable for carrying out the invention are shown, by way of example, in the accompanying drawings, wherein:

FIG. 2 shows a modified oven construction.

Figure 1:
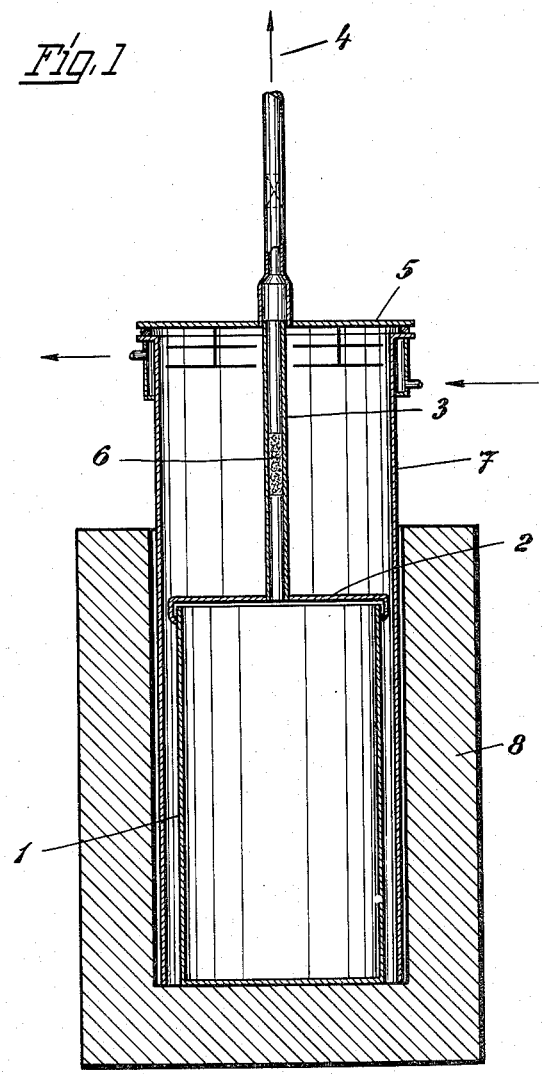
FIG. 1 shows an oven and a reaction vessel equipped with a capillary tube.

Referring first to FIG. 1, reference numeral 1 designates an iron cylinder to which a lid 2 has been gas-tight welded. The lid 2 is equipped with a capillary tube 3, which has a cross-section of about 3 to 20 mm. per kg. of reduction mixture in cylinder 1. The assembly is placed in a larger cylinder 7 provided with a water-cooled lid 5, which is connected at 4 to a high vacuum source. Said cylinder 7 is placed in an oven 8 which heats said cylinder 7 only to a level somewhat above the upper end of reduction cylinder 1, including about ¼ of the length of the capillary tube 3. ¾ of the length of the capillary tube and the water-cooled lid 5 are outside the heating zone. When cylinders 7 and 1 are evacuated by connection to the high vacuum and heated to the level set forth above, the following results are obtained: The entire reaction space 1 assumes uniform temperature; therefore, no reduction metal can condense in said space. A condensation can take place only in the capillary tube at 6, since there is a temperature decrease. The condensation of reducing metal at said point will continue until the capillary tube has been closed. Subsequently, the condensation must take place on hotter surfaces of the capillary tube, and from said time on a dynamic equilibrium is established between condensation and evaporation of the reducing metal, which obtains, of course, only in the capillary tube. The amount of condensed reducing metal is very small and generally in the order of magnitude of about 1 percent of the amount required for the reduction proper. In the reaction tube 1, there is no condensation.

Whereas the oven of FIG. 1 is particularly suitable for the reduction of pure starting materials, the apparatus shown in FIG. 2 can be used also for the reduction of impure oxides or ores. In said apparatus, the capillary tube 3 of FIG. 1 is replaced by an iron tube 13, the width of which depends on the reaction volume and the volume of the vaporized impurities to be evacuated. The reaction cylinder 11 and the vacuum oven 17 are connected to two separate vacuum systems 14 and 28, respectively. The reaction cylinder 11 is closed by a lid 10, which lid carries said tube 13 and a thermocouple. Said nipples should be long enough to prevent heat-deterioration of the vacuum-tight rubber stoppers 25 and 26.

The cylinder 11 is heated by radiation from suitable heating elements. The walls of the cylinder are not subjected to any pressure differential. A cooler 27 is provided for cooling the tube 13. At 16, the tube 13 is filled with a loose pad of steel wool or similar material to assist the sealing of the tube by the reducing metal condensed at said point.

The vacuum system 14 for the tube 13 allows of considerably higher pumping speeds and produces higher final vacua than the system 24 for the oven 17. This is necessary to free the reaction mixture during the heating up period from occluded, adsorbed and chemically bound gases, such as water, carbon dioxide, or nitrogen. Nitrogen is easily introduced into the system as nitride impurity of calcium used as reducing metal; its transfer to the reduced metal, such as titanium, must be avoided because it has a very unfavorable effect on the mechanical properties of the metal.

The following examples are given to illustrate the invention.

*Example 1*

The reduction of titanium dioxide is carried out in the apparatus of FIG. 1, wherein the cylinder 1 has a diameter of 5 cm. and a height of 30 cm. and the capillary tube 3 has a diameter of 2 mm. and a length of 30 cm.

A mixture of 100 g. of $TiO_2$ and 120 g. of Ca is placed in the cylinder 1, and the oven is evacuated to a vacuum of $10^{-2}$ Torr. Then the oven is heated at 950 to 1000° C. and maintained at said temperature for 4–6 hours. The reaction starts at about 700° C., whereby for a short time the temperature rises faster in the cylinder 1 than in the remaining part of the oven. During said time, part of the calcium evaporates and condenses at 6 in the nonheated part of the capillary tube. The formed plug seals hermetically the capillary tube and the entire reaction space, and the reaction proceeds to termination by the stable calcium vapor atmosphere inside the reaction space.

After cooling, the lid 2 is cut off and the mixture of CaO and titanium is machined out of the cylinder. The CaO is removed in a cooled beaker by leaching with water, or dilute hydrochloric or acetic acid, and the remaining powdery titanium is dried at 80° C. The yield is 58 g., corresponding to 97 percent. The powder is compressed to pellets at a pressure of 4000 kg. and sintered for 10 hours in high vacuum at 1000–1100° C. The sintered pellets are cold malleable and have a Brinell hardness of 140–160.

The cylinder 1 and lid 2 may be re-used for the reduction of other batches.

*Example 2*

In the same apparatus as used in Example 1, 40 g. of rare earth metal oxides (86% of cerium earths containing 46% of Ce, and 8% of yttrium earths) and 110 g. of magnesium are heated in vacuo for 90 minutes at 950° C. After the reaction temperature has been reached, the capillary tube is closed by evaporated and re-condensed magneisum. The reaction product is removed as set forth in the preceding example and processed according to the desired use.

As the oxides of the rare earth metals are insoluble in dilute hydrochloric acid, complete reduction thereof in the reduction product can be readily ascertained.

In order to recover the pure rare earth metals, the excess magnesium is distilled off in vacuo. The residue contains the metals of the rare earths and magnesia. A separation of said metals from the magnesia succeeds best magnetically.

The obtained reaction product may be used directly for the preparation of low percent alloys of the rare earth metals, particularly for magnesium alloys, since on melting the Mg-rare earth metals-MgO mixture with an excess of magnesium a separation of the MgO takes place, due to the difference in the specific gravities.

*Example 3*

A reaction mixture consisting of 9 kg. of rutile (97% $TiO_2$; grain size 0.1 mm.)
12 kg. of calcium in fist-sized lumps (94.5% Ca)
2.3 kg. of finely powdered calcium chloride (90% $CaCl_2$)

were reacted in an apparatus of the type illustrated in FIG. 2, in which the tube 13 had a length of 400 mm. and a diameter of 16 mm.

The mixture was degassed for 6 hours in vacuo at 500° C. and then heated up to 950° C., whereby at 820° C. a second gas development was observed. Then evaporated calcium sealed the tube at 16, whereby the pressure in the tube at the time of the self-sealing was below 0.01 mm. Hg.

The self-sealed system was then maintained at the temperature of 900 to 950° C. for 4 more hours, whereby the pressure in the reaction cylinder was due entirely to the vapor pressure of the calcium enclosed therein.

The reaction product was a loose mass which was readily removed from the reaction tube, without requiring turning operations or the like. After leaching out of the metal compounds, for instance according to the method disclosed in the patent application Serial No. 770,920 by Heinrich Röck for Removal of Alkaline Earth Metals and Oxides Thereof From the Reaction Product of the Metallothermic Production of Titanium and Zirconium, filed concurrently herewith, 4.53 kg. of powdery titanium were obtained. The yield was 85%. An analysis showed 98% Ti, 1.2% Fe, 0.2% Ca, and less than 0.01% N. The grain size corresponded approximately to the size of the used rutile. Arc-melted button ingot samples of the titanium powder showed a Brinell hardness of 300 to 400. The product was very suitable for the electrolytic melt refining.

When subjecting impure ores or oxides to my process, I prefer to use an excess of about 30 percent of the reducing metal over the stoichiometric amount and to add about 3 to 15 preferably about 10 percent of an alkaline earth metal chloride, calculated on the total weight of metal oxide and reduction metal.

Though I have given examples only for the application of my method to the reduction of titanium oxide and rare earths, it will be readily understood that the method is equally adapted for the vacuum reduction of zirconium oxide, hafnium oxide and other oxides whenever reducible by alkaline earth metals, whenever said alkaline earth metals can be used for the self-sealing of the reaction zone in the manner set forth hereinabove.

I claim:

1. A method of preparing a pure metal of the group consisting of rare earth metals, titanium, zirconium, hafnium, thorium, vanadium, columbium, tantalum, chromium, molybdenum, tungsten, and uranium comprising providing a substantially closed reaction zone, placing into said reaction zone a mixture containing said metal essentially in the form of its oxide and as sole reducing agent an alkaline earth metal, connecting said reaction zone with a vacuum source, degassing and evacuating said reaction zone and said mixture, heating said reaction zone and mixture in vacuo to a temperature of about 600 to 1200° C., thereby evaporating part of said alkaline earth metal, condensing said evaporated alkaline earth metal in said vacuum connection, thereby sealing off the reaction zone at said temperature and enclosing therein at reduced pressure an atmosphere consisting substantially only of the vapor of said alkaline earth metal, maintaining said temperature until said metal oxide has been substantially reduced, and removing the thus obtained reaction product.

2. The method claimed in claim 1 wherein said mixture contains, in addition to said metal oxide and alkaline earth metal, about 3 to 15 percent of alkaline earth metal chloride, calculated on the weight of said mixture of metal oxide and alkaline earth metal.

3. The method as claimed in claim 1 wherein the alkaline earth metal is used in an excess of 10 to 40 percent of the stoichiometrically required amount.

4. The method as claimed in claim 1 wherein the condensation zone of said vacuum connection has a diameter of about 3 to 20 mm. per kg. of the reaction mixture.

5. The method claimed in claim 1 comprising providing a heating zone surrounding, but separated from, said reaction zone, evacuating said heating zone and reaction zone independently from each other, and producing in said reaction zone a higher vacuum than in said heating zone.

6. A method of preparing titanium metal of high purity comprising heating at a temperature of about 900 to 1000° C. titanium dioxide and calcium in a closed evacuated reaction zone containing an atmosphere consisting essentially only of calcium vapor, maintaining the entire reaction zone at said temperature until the reaction is substantially completed, and subsequently separating the obtained titanium metal from the formed calcium oxide.

References Cited in the file of this patent

UNITED STATES PATENTS

| | | |
|---|---|---|
| 2,038,402 | Alexander | Apr. 21, 1936 |
| 2,607,675 | Gross | Aug. 19, 1952 |
| 2,700,606 | Wilhelm | Jan. 25, 1955 |
| 2,718,464 | Gross | Sept. 20, 1955 |
| 2,727,817 | Whaley | Dec. 20, 1955 |
| 2,805,935 | Camescasse | Sept. 10, 1957 |
| 2,814,561 | Erasmus | Nov. 26, 1957 |

FOREIGN PATENTS

| | | |
|---|---|---|
| 675,933 | Great Britain | July 16, 1952 |
| 790,868 | Great Britain | Feb. 19, 1958 |